United States Patent
Liu et al.

(10) Patent No.: US 9,195,945 B2
(45) Date of Patent: Nov. 24, 2015

(54) INFERRING ATTRIBUTE AND ITEM PREFERENCES

(71) Applicant: GENERAL INSTRUMENT CORPORATION, Horsham, PA (US)

(72) Inventors: Jianguo Liu, Chicago, IL (US); Mir F. Ali, Rolling Meadows, IL (US); Paul C. Davis, Arlington Heights, IL (US); Guohua Hao, Vernon Hills, IL (US)

(73) Assignee: ARRIS Technology, Inc., Suwanee, GA (US)

( * ) Notice: Subject to any disclaimer, the term of this patent is extended or adjusted under 35 U.S.C. 154(b) by 180 days.

(21) Appl. No.: 13/793,650

(22) Filed: Mar. 11, 2013

(65) Prior Publication Data

US 2014/0258204 A1    Sep. 11, 2014

(51) Int. Cl.
*G06N 5/04*    (2006.01)

(52) U.S. Cl.
CPC ........................... *G06N 5/04* (2013.01)

(58) Field of Classification Search
CPC ........................................................ G06N 5/04
USPC .............................................................. 706/46
See application file for complete search history.

(56) References Cited

U.S. PATENT DOCUMENTS

| | | | |
|---|---|---|---|
| 7,840,986 | B2 | 11/2010 | Ali et al. |
| 2002/0178448 | A1 | 11/2002 | Te Kiefte et al. |
| 2003/0225777 | A1 | 12/2003 | Marsh |
| 2005/0251437 | A1 | 11/2005 | Meuleman |
| 2008/0126303 | A1 | 5/2008 | Park et al. |

OTHER PUBLICATIONS

Koren et al ("Matrix Factorization techniques for recommender systems" 2009).*
PCT Search Report & Written Opinion, RE: Application #PCT/US14/19725; dated Aug. 22, 2014.
Sen, Shilad et al.: "Tagommenders: Connecting Users to Items Through Tags", Copyright is held by the International World Wide Web Conference Committee (IW3C2), WWW 2009, Apr. 20-24, 2009, Madrid, Spain, all pages.
M. Kaminskas, "Matching information content with music.", ResearchGate Conference Paper, Jan. 2009, 5 pgs.

(Continued)

*Primary Examiner* — Lut Wong
(74) *Attorney, Agent, or Firm* — Stewart M. Wiener

(57) ABSTRACT

User-preference datapoints are collected. At least some of these datapoints are associated with user-preference information about an item (e.g., a movie), and some of these datapoints are associated with user-preference information about an attribute (e.g., a movie genre or an actor). A profile of the user is created based, at least in part, on these datapoints. When a new datapoint is collected, the new datapoint is assigned a user-preference "score." If, for example, the new datapoint does not come with an explicit user-preference rating, then the score is based on related item and attribute datapoints already in the profile. Depending upon the relationship of the new datapoint to the already existing datapoints, a confidence value is assigned to the user-preference score. The profile is then updated with the new datapoint along with its assigned score and confidence rating. The user profile can be used in performing any number of actions.

14 Claims, 3 Drawing Sheets

(56) References Cited

OTHER PUBLICATIONS

R. Pinto Peixoto, "Traceability-based Access Recommendation", Instituto Superior de Engehario do Porto, Oct. 2012, 96 pgs.

D. Weiss, et al., "A User Profile-based Personalization System for Digital Multimedia Content," DIMEA '08: Proceedings of the 3rd international conference on Digital Interactive Media in Entertainment and Arts, New York, NY, USA: ACM. ISBN: 978-1-60558-248-1, pp. 281-288 (2008).

* cited by examiner

INFERRING ATTRIBUTE AND ITEM PREFERENCES

TECHNICAL FIELD

The present disclosure is related generally to user-profile information and, more particularly, to user-preference data.

BACKGROUND

Systems that produce recommendations and that profile users are heavily dependent on "user-preference models." These models are built on the accumulation and processing of as much user-preference data as possible.

Generally speaking, numerous types of user-preference data may be available for modeling. These data types span the spectrum from implicit user actions to explicit preference statements.

Implicit data include "access-only" observations where the user, e.g., accesses a web site or views a movie, but where he does not explicitly state (or otherwise indicate) a preference. Additional information may be available to allow the system to infer the user's preference, at least relatively.

On the other end of the spectrum are explicit ratings made by a user (e.g., he posts his ranking of a movie).

In between these extremes there is a continuum of user-preference data where additional information regarding a user's interaction is available for inferring, to a greater or lesser degree of confidence, the user's preference. If, for example, the user watches all of a movie (but does not post a rating of it), then it may be inferred that he liked it. On the other hand, if the user stopped watching a movie a few minutes in, then maybe he did not like what he was seeing.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
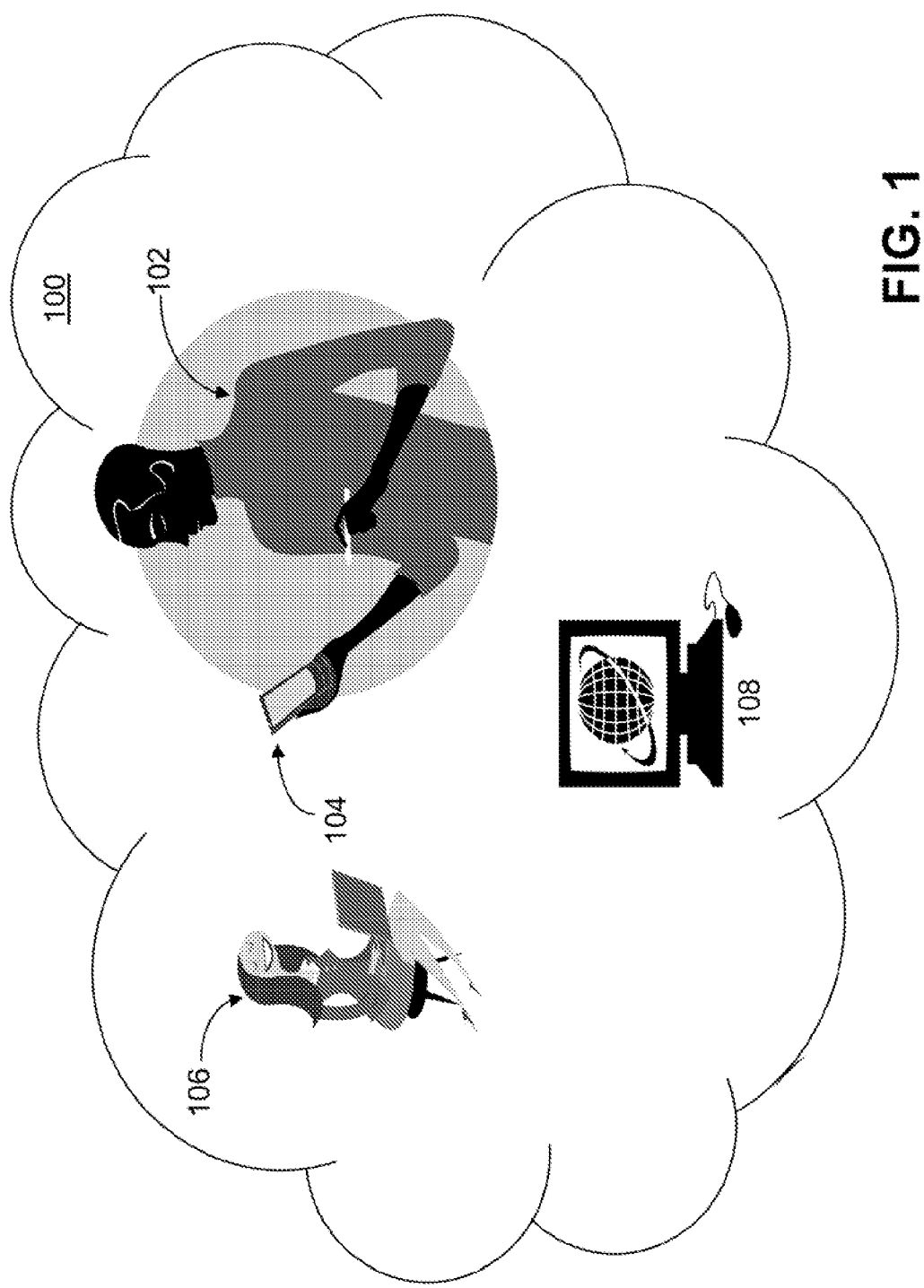
FIG. 1 is an overview of a representative environment in which the present techniques may be practiced.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

While explicit preference statements are very useful in creating user-preference models, the majority of available user-preference datapoints, generally speaking, are not so explicit. Preference models could become more accurate and applicable to more situations if they could consider the great number of available non-explicit datapoints, that is to say, if these non-explicit datapoints could be leveraged for whatever information they may provide about user-preferences.

Consider the representative communications environment 100 of FIG. 1. As the user 102 goes about his day, he generates information, explicitly or implicitly, about his preferences. He may, for example, use his personal communications device 104 to communicate with a colleague 106. He may also interact with a number of web sites (represented by the server 108) to shop, to post his own review of a movie he just watched, or to keep up with the activities of his friends. All of these communicative activities can be used to profile the user's preferences.

According to aspects of the present disclosure, user-preference datapoints are collected. At least some of these datapoints are associated with user-preference information about an "item," and at least some of these datapoints are associated with user-preference information about an "attribute." An "item" (e.g., a movie, book, song, restaurant, or website), while existing as an entity in its own right, is typically also composed of a plurality of "attributes" (e.g., genre, creator, actor, or duration) that are relevant to the type of the item. A profile of the user 102 is created based, at least in part, on these datapoints. When a new datapoint is collected, the new datapoint is assigned a user-preference "score." If, for example, the new datapoint does not come with an explicit user-preference rating, then the score is based on related item and attribute datapoints already in the profile. Depending upon the relationship of the new datapoint to the already existing datapoints, a confidence value is assigned to the user-preference score. The profile is then updated with the new datapoint along with its assigned score and confidence rating. The user profile can be used in performing any number of actions.

Figure 2:
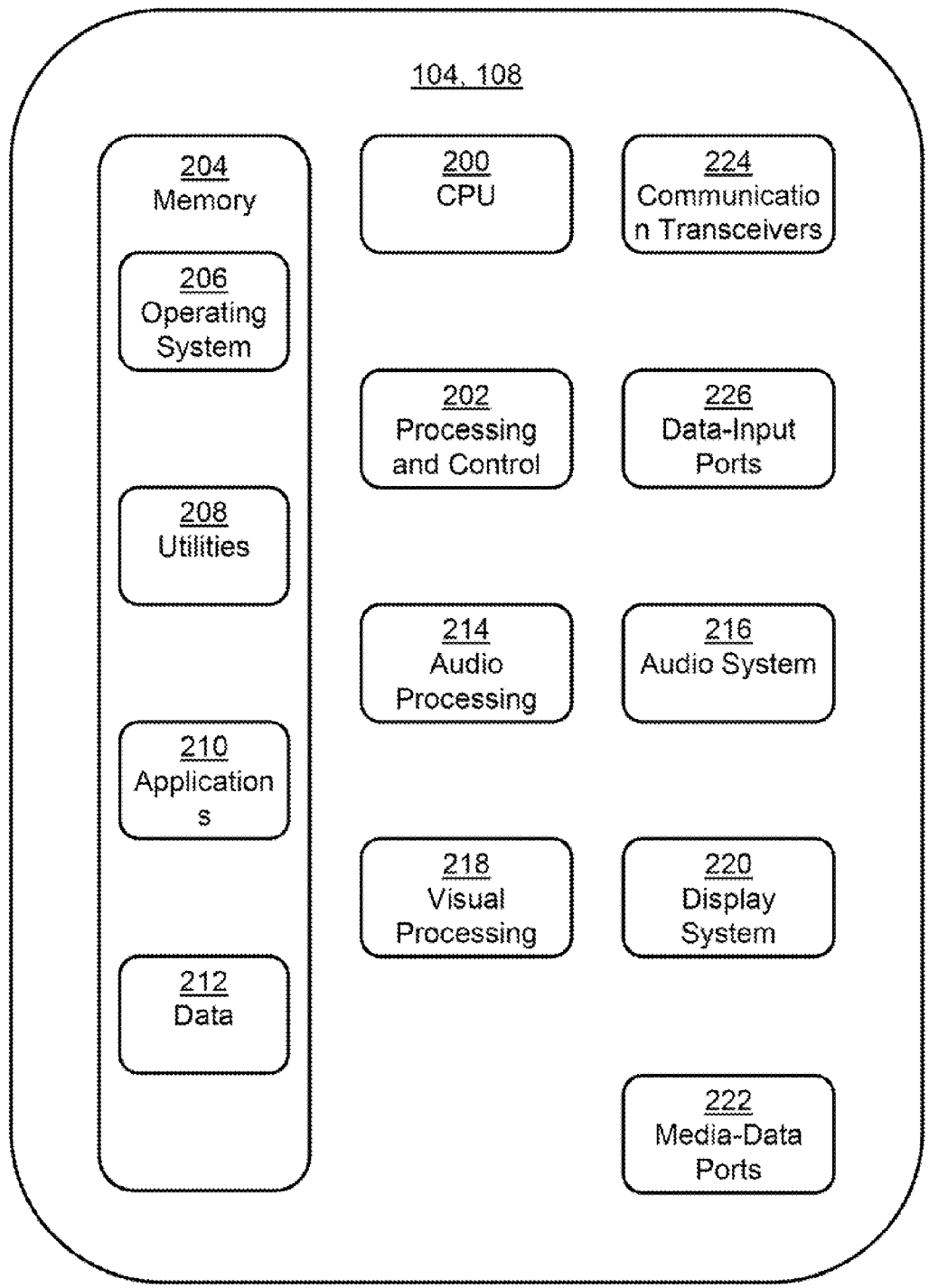
FIG. 2 is a generalized schematic of some of the devices of FIG. 1.

FIG. 2 shows the major components of a representative electronic device 104, 108. The device 104, 108 could be a personal electronics device (such as a smart phone, tablet, personal computer, or gaming console), a set-top box driving a television monitor, or a compute server. It could even be a plurality of servers working together in a coordinated fashion.

Figure 3:
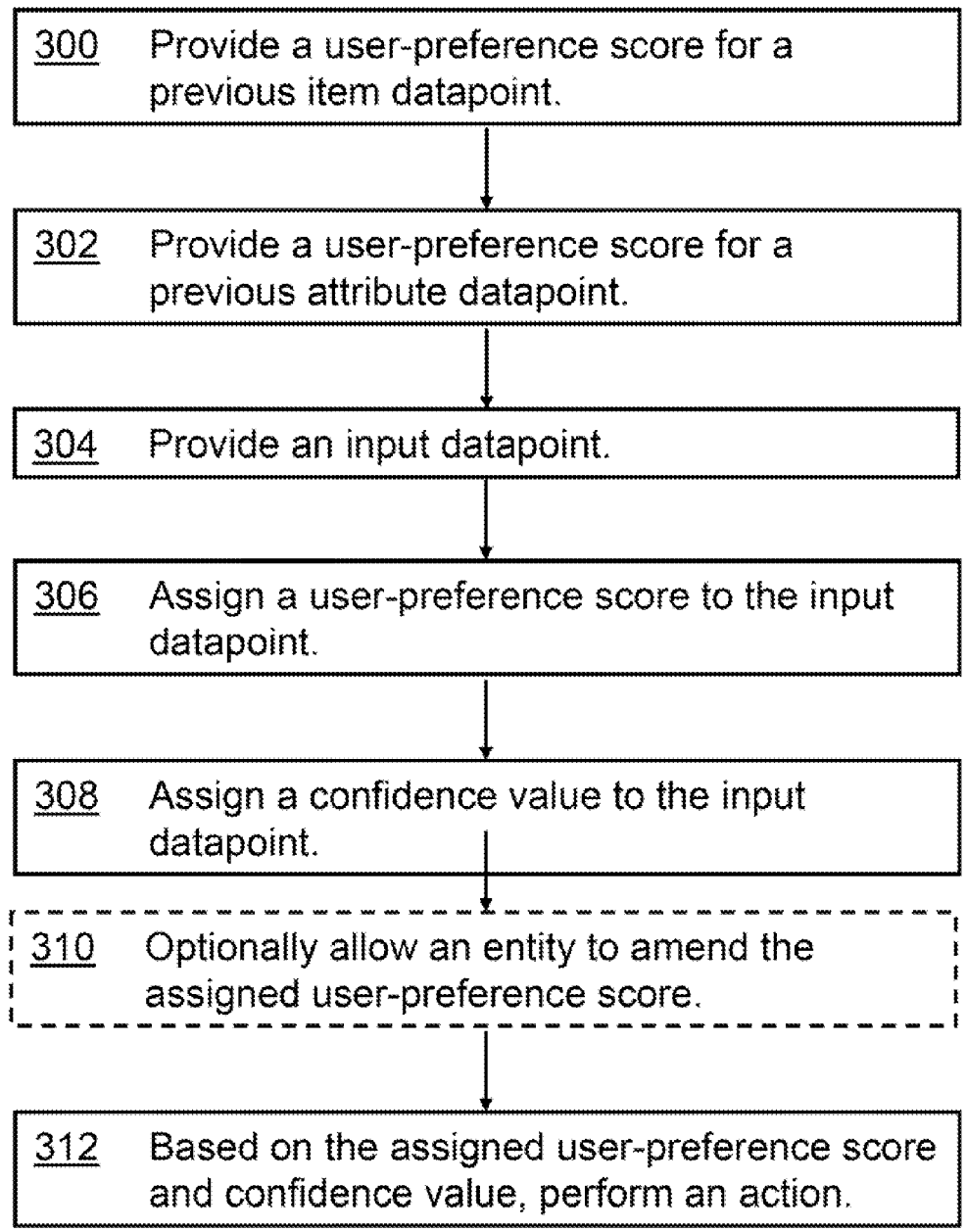
FIG. 3 is a flowchart of a representative method for using inferred preferences to perform an action.

The CPU 200 of the electronic device 104, 108 includes one or more processors (i.e., any of microprocessors, controllers, and the like) or a processor and memory system which processes computer-executable instructions to control the operation of the device 104, 108. In particular, the CPU 200 supports aspects of the present disclosure as illustrated in FIG. 3, discussed below. The device 104, 108 can be implemented with a combination of software, hardware, firmware, and fixed-logic circuitry implemented in connection with processing and control circuits, generally identified at 202. Although not shown, the device 104, 108 can include a system bus or data-transfer system that couples the various components within the device 104, 108. A system bus can include any combination of different bus structures, such as a memory bus or memory controller, a peripheral bus, a universal serial bus, and a processor or local bus that utilizes any of a variety of bus architectures.

The electronic device 104, 108 also includes one or more memory devices 204 that enable data storage, examples of which include random-access memory, non-volatile memory (e.g., read-only memory, flash memory, EPROM, and EEPROM), and a disk storage device. A disk storage device may be implemented as any type of magnetic or optical storage device, such as a hard disk drive, a recordable or rewriteable disc, any type of a digital versatile disc, and the like. The device 104, 108 may also include a mass-storage media device.

The memory system 204 provides data-storage mechanisms to store device data 212, other types of information and data, and various device applications 210. An operating system 206 can be maintained as software instructions within the memory 204 and executed by the CPU 200. The device applications 210 may also include a device manager, such as any form of a control application or software application. The utilities 208 may include a signal-processing and control module, code that is native to a particular component of the electronic device 104, 108, a hardware-abstraction layer for a particular component, and so on.

The electronic device 104, 108 can also include an audio-processing system 214 that processes audio data and controls an audio system 216 (which may include, for example, speakers). A visual-processing system 218 processes graphics commands and visual data and controls a display system 220 that can include, for example, a display screen. The audio system 216 and the display system 220 may include any devices that process, display, or otherwise render audio, video, display, or image data. Display data and audio signals can be communicated to an audio component or to a display component via a radio-frequency link, S-video link, High-Definition Multimedia Interface, composite-video link, component-video link, Digital Video Interface, analog audio connection, or other similar communication link, represented by the media-data ports 222. In some implementations, the audio system 216 and the display system 220 are components external to the device 104, 108. Alternatively (e.g., in a cellular telephone), these systems 216, 220 are integrated components of the device 104, 108.

The electronic device 104, 108 can include a communications interface which includes communication transceivers 224 that enable wired or wireless communication. Example transceivers 224 include Wireless Personal Area Network radios compliant with various IEEE 802.15 standards, Wireless Local Area Network radios compliant with any of the various IEEE 802.11 standards, Wireless Wide Area Network cellular radios compliant with 3GPP standards, Wireless Metropolitan Area Network radios compliant with various IEEE 802.16 standards, and wired Local Area Network Ethernet transceivers.

The electronic device 104, 108 may also include one or more data-input ports 226 via which any type of data, media content, or inputs can be received, such as user-selectable inputs (e.g., from a keyboard, from a touch-sensitive input screen, or from another user-input device), messages, music, television content, recorded video content, and any other type of audio, video, or image data received from any content or data source. The data-input ports 226 may include USB ports, coaxial-cable ports, and other serial or parallel connectors (including internal connectors) for flash memory, storage disks, and the like. These data-input ports 226 may be used to couple the device 104, 108 to components, peripherals, or accessories such as microphones and cameras.

FIG. 3 presents a method for extracting useful preference information even from observations that are not associated with explicit user ratings. There is no limitation on where the method of FIG. 3 could be performed. It could be performed on the user's personal communications device 104, on a remote server 108, or even on a combination of these and other devices.

For ease of discussion, the following assumes that datapoints are used to model preferences of the user 102. However, the same techniques can be applied to model preferences of an entity other than the user 102, such as a social or professional group or some other corporate entity.

In the method of FIG. 3, steps 300 and 302 set the stage for the remaining steps. In some embodiments, these steps 300, 302 create a preference model for the user 102. In step 300, a user-preference score is provided for an "item" datapoint, and a user-preference score is provided for an "attribute" datapoint in step 302. For example, the user 102 explicitly provides a rating for a movie (an "item") (step 300). Observations of the user's behavior are collected and analyzed to determine that he tends to watch westerns more than any other type of movie. From this implicit data, a user-preference score is assigned to "westerns" indicating the user's preference for this genre (an "attribute") (step 302). While these steps 300, 302 are written in the singular, more observations generally lead to greater power in any resulting preference model. It is contemplated that these steps 300, 302 are repeated through time, always adding new datapoints to refine the preference model.

In step 304, a new datapoint is provided. For example, the new datapoint could be an observation of the user's behavior, a preference explicitly stated by the user 102, a preference explicitly stated by an entity other than the user 102 (but relevant to the user 102 in some way), passive usage data (e.g., websites that the user 102 visits frequently but does not explicitly rate), and passive contextual data. For privacy reasons, numerous demographic or behavioral observations may be statistically aggregated into a single new datapoint that is then fed into step 304.

Many types of observations, from any number of domains, can be included in steps 300, 302, and 304. In addition to the examples already given, observations can include ratings posted by the user 102 on items related to the item currently being rated (i.e., what range of ratings does the 102 typically use?), which portions of a webpage he visited or viewed, and how much attention he paid to a media-content item (as measured by, for example, gaze-tracking software). The recency and frequency of a repeated observation can themselves become new observations. Contextual information can be included in the observation (where? with whom? what else was he doing at the time?). Some information is domain-specific, such as how much of a movie did the user 102 watch?, how did he respond to a purchase recommendation?, and to how many friends did he post a social-network update?

While many new datapoints are directly associated with the user 102, some may not be. A new datapoint associated with a social group that includes the user 102 may provide relevant information about the user's preference. Some information, though possibly information of low value, may be gathered from a datapoint associated with a friend or a work colleague 106 of the user 102. Useful datapoints may be associated with other groups of people. For example, demographic information may be analyzed to determine that working engineers tend to watch science-fiction programming more than they watch regency romances. Care must be taken, of course, to avoid putting too much emphasis on datapoints only marginally related to the particular user 102. (He may be an engineer who really likes Jane Austen's novels.)

In step 306, the new datapoint is analyzed, and a user-preference score is assigned to it. For a datapoint that is associated with an explicit rating, the assigned score could simply reflect that rating. (Although a sophisticated system may inquire further: Some people assign ratings based on what they believe they "should" like rather than on what they really do like. A sophisticated model, with a great deal of observational data behind it, can account for this tendency and, in consequence, make the preference model more accurate.)

The user-preference score can also be based on further information. If, for example, the new datapoint is an "item" observation (e.g., the user 102 watched, but did not rate, a movie), then attributes of this item can be compared to already known user-preference scores of identical or similar attributes (from step 302). If the recently watched movie features an actor known from previous observations to be greatly admired by this user 102, then the assigned user-preference score can reflect this admiration (in the absence of countervailing information). Similarly, a new "attribute" observation can be analyzed in light of previous "item" observations that share this attribute. This is possible because of the relationship between "items" and "attributes," that is, because an item is typically composed of a plurality of attributes.

Other information can be used to inform the assignment of a user-preference score in step 306. In addition to the cross item/attribute analysis discussed above, a new "item" datapoint can be analyzed for similarity with existing item datapoints, and a new "attribute" datapoint can be analyzed for similarity with existing attribute datapoints. Information can be used across domains: If the user 102 is known to prefer western movies, it might be inferred that he also likes western music. (Previous observations of the population can be analyzed to assign a weight to this cross-domain inference.) Typically such cross-domain inferences result in significantly lower confidence values, but they can be used to infer preferences when there is little additional or reliable information for the domains. Attribute value scores can vary across domains. Also during the assigning of a score, rules and policies can be applied to, for example, apply weights to different types of datapoints. For privacy reasons (and to avoid annoying the user 102), some new datapoints can be simply ignored.

It is expected that datapoints will be collected from a wide variety of sources. Given that and given the differing natures of the datapoints, some datapoints will more reliably reflect the user's preferences than others. Step 308 addresses this by assigning a confidence value to the user-preference score assigned to the new datapoint. A preference explicitly stated by the user 102 may be given a high confidence score (with the caveat discussed above that a user's explicit statement may not match his reality). On the other hand, as is well known, any person may go beyond the range of his normal habits, watching, for example, a movie outside of the genres he is known to prefer. Knowing that the user 102 has watched such a movie, without more information, may not indicate that the user 102 now likes this new genre. Such an observation may be given a low confidence score, reflecting that little weight should be given to it.

The assigned confidence value can also be based on a comparison with the existing datapoints of steps 300 and 302. If the user 102 tends to be consistent in his likes and dislikes (a factor that can itself be determined by analyzing the existing datapoints), then a new datapoint that closely tracks previous observations could be given a high confidence score. An observation very much out of line with previous observations could still be correct, but confidence in it could be low.

Optional step 310 acknowledges that the modeling process is imperfect and may be often incorrect. Here, the user 102 is invited to amend the user-preference score assigned by the system in step 306. If he chooses to do so, then the user-assigned score replaces the system-assigned score, and the confidence value may be increased.

By the end of step 308 (or step 310 if implemented), the preference model for the user 102 has been updated to reflect the new datapoint received in step 304.

In step 312, the user-preference model is actually used, as is known in the art. Typical uses include, for example, choosing a particular advertisement, notification, or other message to send to the user 102 based on his preferences, initiating an interaction, providing a recommendation to the user 102, providing a prediction, and mapping a behavioral pattern. Some of these uses could directly lead to further new datapoints as, for example, when the user 102 responds (or fails to respond) to a recommendation to watch a new movie that matches his known preferences.

As new datapoints are collected, they are added to the existing model. Also, the analysis of new inputs can lead to a re-evaluation of existing datapoints. For example, over time, the confidence value given to a datapoint may rise (or fall) as subsequent datapoints confirm (or deny) the validity of its information.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method for a profile engine to perform an action based on an input datapoint, the method comprising:

providing, to the profile engine, user-preference scores for a plurality of previous datapoints, the plurality of previous datapoints comprising an item datapoint and an attribute datapoint, the input datapoint distinct from the plurality of previous datapoints;

assigning, by the profile engine, a user-preference score to the input datapoint based on a cross-domain inference, wherein the cross-domain inference comprises an inference, based on a first genre preference for a genre associated with items in a first domain, of a second genre preference for a corresponding genre associated with items in a second domain different from the first domain, wherein the first domain and the second domain are selected from a group consisting of movies, programming, music, books, restaurants, and websites, and wherein if the input datapoint is an item datapoint, then the assigning is based, at least in part, on a user-preference score for a previous attribute datapoint, else if the input datapoint is an attribute datapoint, then the assigning is based, least in part, on a user-preference score for a previous item datapoint;

based on a cross-domain inference, wherein the cross-domain inference comprises an inference, based on a first genre preference for a genre associated with items in a first domain, of a second genre preference for a corresponding genre associated with items in a second domain different from the first domain;

based, at least in part, on a comparison of the input datapoint with at least a subset of the plurality of previous datapoints, assigning, by the profile engine, a confidence value to the input datapoint, and lowering the confidence value assigned to the input datapoint based on the cross-domain inference;

based, at least in part, on the user-preference score and on the confidence value assigned to the input datapoint, performing, by the profile engine, an action.

2. The method of claim 1 wherein the input datapoint is selected from the group consisting of: a behavioral observation, a preference explicitly stated by a user, a preference explicitly stated by something other than the user, passive usage data, passive contextual data, and a statistical aggregation of behavioral data.

3. The method of claim 1 wherein the input datapoint is associated with an entity selected from the group consisting of: a person, a plurality of persons, a corporate entity, a social network of persons, a group of persons defined by a shared contextual attribute, and an entity defined by a collection rule.

4. The method of claim 3 wherein the plurality of the previous datapoints are associated with the entity.

5. The method of claim 1 wherein if the input datapoint is an item datapoint, then the assigning is further based on a user-preference score for a previous item datapoint, else if the input datapoint is an attribute datapoint, then the assigning is further based on a user-preference score for a previous attribute datapoint.

6. The method of claim 1 wherein performing is further based on a rule.

7. The method of claim 1 wherein performing is further based on a policy.

8. The method of claim 1 wherein the action comprises an element selected from the group consisting of: directing an advertisement, directing a notification, initiating an interaction, providing a recommendation, choosing a message to send, providing a prediction, and mapping a behavioral pattern.

9. The method of claim 1 further comprising:
presenting, to an entity associated with the input datapoint, the user-preference score assigned to the input datapoint;
receiving, from the entity, an amendment to the user-preference score for the input datapoint; and
amending the confidence value for the input datapoint.

10. The method of claim 9 further comprising:
based, at least in part, on the amended user-preference score for the input datapoint and on the amended confidence value for the input datapoint, performing, by the profile engine, an action.

11. The method of claim 1 wherein assigning, by the profile engine, the user-preference score to the input datapoint further comprises:
applying a rule for ignoring the input datapoint based on privacy reasons.

12. A profile engine configured for performing an action based on an input datapoint, the profile engine comprising:
a memory configured for storing user-preference scores for a plurality of previous datapoints, the plurality of previous datapoints comprising an item datapoint and an attribute datapoint, the input datapoint distinct from the plurality of previous datapoints; and
a processor operatively connected to the memory and configured for:
assigning a user-preference score to the input datapoint based on a cross-domain inference,
wherein the cross-domain inference comprises an inference, based on a first genre preference for a genre associated with items in a first domain, of a second genre preference for a corresponding genre associated with items in a second domain different from the first domain, wherein the first domain and the second domain are selected from a group consisting of movies, programming, music, books, restaurants, and websites, and
wherein if the input datapoint is an item datapoint, then the assigning is based, at least in part, on a user-preference score for a previous attribute datapoint, else if the input datapoint is an attribute datapoint, then the assigning is based, least in part, on a user-preference score for a previous item datapoint;
based, at least in part, on a comparison of the input datapoint with at least a subset of the plurality of previous datapoints, assigning a confidence value to the input datapoint, and lowering the confidence value assigned to the input datapoint based on the cross-domain inference; and
based, at least in part, on the user-preference score and on the confidence value assigned to the input datapoint, performing an action.

13. The profile engine of claim 12 wherein the profile engine is selected from the group consisting of: a personal electronics device, a mobile telephone, a personal digital assistant, a tablet computer, a gaming console, a compute server, and a coordinated group of compute servers.

14. The profile engine of claim 12 wherein assigning, by the profile engine, the user-preference score to the input datapoint further comprises:
applying a rule for ignoring the input datapoint based on privacy reasons.

* * * * *